June 21, 1938.  A. E. NIELSEN  2,121,710
THREADLESS INTERLOCKING ROTARY DRILL PIPE COUPLING
Filed May 18, 1937
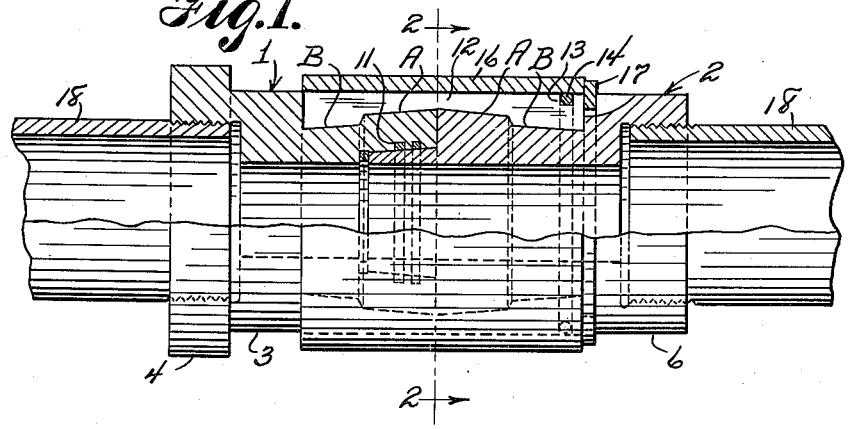
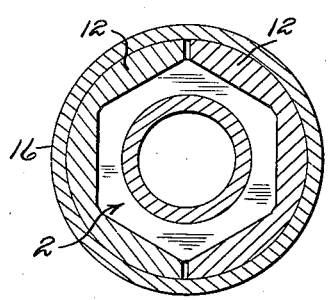
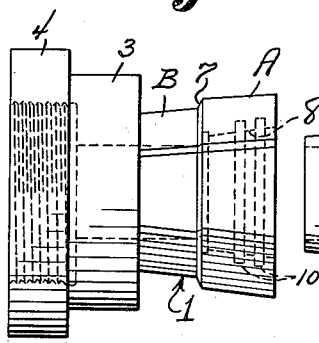
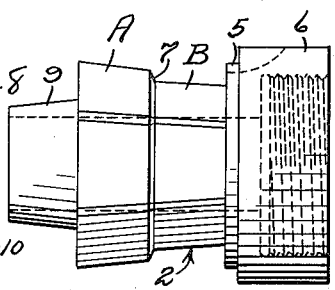
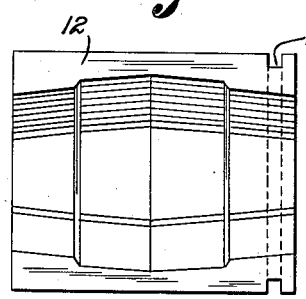
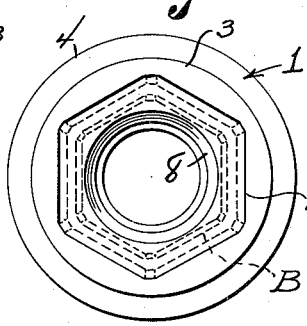
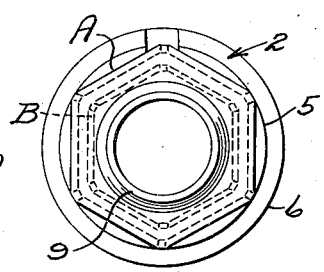
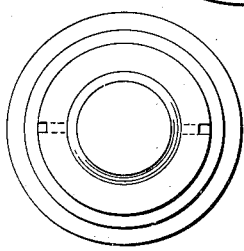
Adolph E. Nielsen
INVENTOR
BY Victor J. Evans & Co.
ATTORNEYS Patented June 21, 1938

2,121,710

UNITED STATES PATENT OFFICE 2,121,710

THREADLESS INTERLOCKING ROTARY DRILL PIPE COUPLING

Adolph E. Nielsen, Alameda, Calif., assignor, by direct and mesne assignments, of one-sixth to John W. Ricketts, one-sixth to David A. Davini, and one-third to Randal F. Dickey, all of Alameda, Calif.

Application May 18, 1937, Serial No. 143,370

1 Claim. (Cl. 285—194)

REISSUED

OCT 22 1940

This invention relates to a threadless rotary drill pipe coupling of the character having features similar to the type of coupling set forth in my copending application No. 133,458, filed May 27, 1937 and executed March 18, 1937, and has for the primary object the provision of a quick detachable device including male and female elements which cooperate in establishing a leakproof device when assembled capable of withstanding high pressures of fluid and also will efficiently transmit excessive pressure, tension and torsion strains without affecting the leakproof feature afforded by the device.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation partly in section illustrating a coupling especially adapted for connecting rotary drill pipes or tubes and constructed in accordance with the present invention.

Figure 2 is a transverse sectional view taken on the line 2—2 of Figure 1.

Figure 3 is a side elevation illustrating the female element of the coupling.

Figure 4 is a side elevation illustrating the male element of the coupling.

Figure 5 is a vertical sectional view illustrating a split sleeve.

Figure 6 is an end view illustrating the female element.

Figure 7 is an end view illustrating a male element.

Figure 8 is an end view illustrating a modified form of my invention.

Referring in detail to the drawing, the numeral 1 indicates a female element and 2 a male element. These elements have a bore which when brought together provide a substantially unobstructed passage for fluid to flow through. The female element has formed thereon groups of angularly related faces A and B. The female element also includes an annular portion 3 and an internally threaded portion 4. The male element 2 also includes groups of angularly related faces A and B and an annular portion 5 and an internally screw threaded portion 6. The groups of angularly related faces B of the elements 1 and 2 are of a smaller external diameter than the angularly related faces A of said elements 1 and 2 which provide between the groups of faces shoulders 7. The female element 1 has a tapered bore 8, while the male element 2 has a substantially tapered or conical-shaped portion 9 adapted to fit within the bore 8 of the female element with a ground fit to prevent leakage. Packing grooves 10 are formed in either the female or male element or both in which packing 11 is positioned to contact the portion 9 of the male element to further assure against the leakage.

A split sleeve 12 has internal faces shaped to fit the faces A and B of the male and female elements and has formed therein a groove 13 to receive a retaining ring 14. One end of the split sleeve abuts the annular portion 3 of the female element and also fits the portion 5 of the male element. The split sleeve 12 has an external taper to fit the inside taper of the sleeve 16. A retaining sleeve 16 fits over the split sleeve and its internal diameter is slightly less than the external diameter of the portion 3 of the female element 20 to prevent endwise movement of the retaining sleeve in one direction. The retaining sleeve overlies the ring 14 and holds the latter in its groove. The diameter of the portion 5 of the male element is less than the diameter of the portion 6 to form a key seat to receive a key 17 which abuts an end of the sleeve 16 and cooperates with the annular portion 3 in preventing endwise movement of the retaining sleeve. When the key is removed the retaining sleeve may be slid over the portions 5 and 6 to expose the split sleeve.

Rotary drill pipes 18 are shown threaded in the threaded bores of the portions 4 and 6 of the male and female elements. However, the drill pipes may be welded or otherwise secured to said portions.

A coupling of the character described will provide an efficient leak proof connection minus screw threads and may be readily disassembled when desired. A coupling of this character is capable of transmitting rotary motion free of any end play within itself and any strains placed thereon will not affect the leak proof connection established by said coupling.

The male and female elements may be constructed round and are provided with keyways to match keyways formed in the split sleeve as suggested in Figure 8.

What is claimed is:

A coupling comprising male and female elements each having a bore therethrough and the female element provided with a tapered seat, a tapered portion formed on said male element to tightly fit the tapered bore of said female element and thereby prevent leakage between said male and female elements, said female element having packing grooves, packing in said grooves and engaging the tapered extension of the male element, groups of angularly related faces formed on the male and female elements and one group of each element being of a different diameter than the diameter of the other group, a split sleeve having internal faces shaped to match the angularly related faces of the male and female elements, a retaining sleeve fitting over the split sleeve and held against endwise movement by the female element, and a key carried by the male element engageable with the retaining sleeve to secure the latter against endwise movement in an opposite direction, and means for connecting well drill tubing to said male and female elements.

ADOLPH E. NIELSEN.